United States Patent
Kim et al.

(10) Patent No.: US 11,446,755 B2
(45) Date of Patent: Sep. 20, 2022

(54) APPARATUS AND METHOD FOR OBJECT TRACKING IN WELDING PROCESS

(71) Applicant: KOREA PHOTONICS TECHNOLOGY INSTITUTE, Gwangju (KR)

(72) Inventors: Hoe Min Kim, Gwangju (KR); Sung Kuk Chun, Gwangju (KR); Dong Kil Lee, Gwangju (KR); Kwang Hoon Lee, Gwangju (KR); Seon Man Kim, Gwangju (KR)

(*) Notice: Subject to any disclaimer, the term of this patent is extended or adjusted under 35 U.S.C. 154(b) by 0 days.

(21) Appl. No.: 16/950,920

(22) Filed: Nov. 18, 2020

(65) Prior Publication Data

US 2022/0088696 A1 Mar. 24, 2022

(30) Foreign Application Priority Data

Sep. 18, 2020 (KR) .................. 10-2020-0120392

(51) Int. Cl.
*G06T 7/70* (2017.01)
*B23K 9/095* (2006.01)

(52) U.S. Cl.
CPC .......... *B23K 9/0956* (2013.01); *B23K 9/0953* (2013.01); *G06T 7/70* (2017.01); *G06T 2207/20081* (2013.01); *G06T 2207/20182* (2013.01); *G06T 2207/30204* (2013.01)

(58) Field of Classification Search
CPC .................................................. B23K 9/0956
USPC ........................................................ 348/90
See application file for complete search history.

(56) References Cited

U.S. PATENT DOCUMENTS

| 2004/0124227 A1* | 7/2004 | Seki ................... B23K 31/125 228/103 |
| 2021/0086310 A1* | 3/2021 | Huh ....................... B23K 37/00 |
| 2021/0138646 A1* | 5/2021 | Matsushima .......... B25J 9/1664 |

(Continued)

FOREIGN PATENT DOCUMENTS

| CN | 111489363 A | * 8/2020 |
| KR | 10-1998-0061700 | 10/1998 |
| KR | 10-2009-0053847 | 5/2009 |

(Continued)

OTHER PUBLICATIONS

English Specification of 10-2009-0053847.

(Continued)

*Primary Examiner* — Amir Shahnami
(74) *Attorney, Agent, or Firm* — Antonio Ha & U.S. Patent, LLC (57) ABSTRACT

According to an embodiment, an object tracking device in a welding process tracks and outputs a predetermined object in a welding image. The object tracking device comprises a camera device capturing the welding image including a base material and a welding torch for welding the base material, a controller receiving a plurality of camera control parameter-varied images from the camera device, identifying the predetermined object in the received images, and generating an object tracking image, the plurality of camera control parameter-varied images having varied camera control parameters of the camera device, and an output device outputting the welding image captured by the camera device, the plurality of images received by the controller, or the object tracking image generated by the controller.

13 Claims, 9 Drawing Sheets

(56) References Cited

U.S. PATENT DOCUMENTS

2021/0291288 A1* 9/2021 Tanaka .................. B23K 9/095

FOREIGN PATENT DOCUMENTS

| KR | 10-2010-0069307 | 6/2010 |
|----|-----------------|--------|
| KR | 10-2012-0054217 | 5/2012 |
| KR | 10-2014-0014481 | 2/2014 |
| KR | 10-1453001 | 10/2014 |
| KR | 10-2015-0041347 | 4/2015 |
| KR | 10-1592790 | 2/2016 |
| KR | 10-2020-0099781 | 8/2020 |

OTHER PUBLICATIONS

English Specification of 10-1998-0061700.
English Specification of 10-2012-0054217.
English Specification of 10-2020-0099781.
English Specification of 10-2010-0069307.
English Specification of 10-2014-0014481.
English Specification of 10-1592790.
English Specification of 10-1453001.
English Specification of 10-2015-0041347.

* cited by examiner

APPARATUS AND METHOD FOR OBJECT TRACKING IN WELDING PROCESS

CROSS-REFERENCE TO RELATED APPLICATION(S)

This application is based on and claims priority under 35 U.S.C. 119 to Korean Patent Application No. 10-2020-0120392, filed on Sep. 18, 2020, in the Korean Intellectual Property Office, the disclosure of which is herein incorporated by reference in its entirety.

TECHNICAL FIELD

Embodiments of the disclosure relate to a technology for tracking an object using a camera in a welding process environment with an excessive dynamic range.

DESCRIPTION OF RELATED ART

The description of the Discussion of Related Art section merely provides information that may be relevant to embodiments of the disclosure but should not be appreciated as necessarily constituting the prior art.

Electric welding (arc welding) is the welding of the same metals by using an air discharge phenomenon. The worker carefully observes the formation of beads and performs welding to obtain the best welding quality.

Laser welding melts and attaches metal parts with a laser beam and is used to weld delicate and fine parts. Laser welding may cause errors in the welding process because it is performed while the worker checks the process with his eyes. Thus, laser welding has restrictions in welding delicate and fine parts.

The worker wears protective gear or goggles and performs welding while simultaneously checking the electric characteristics of the welding machine or the welding line. In this case, the worker may not properly grasp the welding situation due to the light generated during welding or the surrounding environment.

In recent years, the worker may monitor the welding progress using a camera mounted on the protective gear or goggles. However, since the camera adjusts the exposure value based on the average value of the overall image brightness values, if exposed to the light much brighter or darker than the average image brightness, the worker may fail to temporarily identify the welding torch or a specific object through the welding process image, and thus welding quality may be deteriorated.

SUMMARY

According to embodiments, there may be provided a device and method for tracking an object in a welding process, which identifies a target object designated by the user from a welding image captured in a high-dynamic range welding environment due to the welding light or work environment, tracks the target object, and provides the results of the tracking as an augmented reality (AR) image.

However, the objects of the embodiments are not limited thereto, and other objects may also be present.

According to an embodiment, an object tracking device in a welding process tracks and outputs a predetermined object in a welding image. The object tracking device comprises a camera device capturing the welding image including a base material and a welding torch for welding the base material, a controller receiving a plurality of camera control parameter-varied images from the camera device, identifying the predetermined object in the received images, and generating an object tracking image, the plurality of camera control parameter-varied images having varied camera control parameters of the camera device, and an output device outputting the welding image captured by the camera device, the plurality of images received by the controller, or the object tracking image generated by the controller.

The base material may include a marker that may be identified by the controller.

The predetermined object may include the welding torch, a welding tip, and the marker.

The camera control parameters may include at least one of a camera exposure value, a camera sensor color gain value, a gamma value, and a black level.

The object tracking image may include coordinates of each of predetermined objects, or the object tracking image includes the coordinates of each of the predetermined objects and a trajectory of the coordinates varied while welding is performed.

The controller may vary the camera sensor color gain value to allow a spectrum strength of the welding light to have a relatively low wavelength band so as to allow a welding tip to be clearly identified.

The controller may perform pre-treatment to remove, subtract, or reduce a black image captured by the camera device according to each camera control parameter from the received images.

According to an embodiment, a tracking controller tracks a predetermined object in a welding image obtained using a camera. The tracking controller comprises a user input unit receiving an input for a welding environment from a user, a camera controller varying a camera control parameter of the camera to receive a plurality of images the camera control parameter of which have been varied from the camera, a learning unit designating the predetermined object in a plurality of welding images and generating learning data based on feature information about the predetermined object, a memory storing a camera control parameter appropriate for the welding environment and the plurality of welding images by which the learning unit is able to generate the learning data, and an object tracking unit identifying the predetermined object from the plurality of images received by the camera controller from the camera and generating an object tracking image.

The camera controller may vary the camera control parameter of the camera into the camera control parameter appropriate for the welding environment and receives the plurality of camera control parameter-varied images from the camera.

The predetermined object may include a welding torch, a welding tip, and a marker included in a base material.

The camera control parameter may include at least one of a camera exposure value, a camera sensor color gain value, a gamma value, and a black level.

The object tracking image may include coordinates of each of predetermined objects, or the object tracking image includes the coordinates of each of the predetermined objects and a trajectory of the coordinates varied while welding is performed.

According to an embodiment, an object tracking method in a welding process to track and output a predetermined object in a welding image comprises capturing the welding image using a camera device, the welding image including a base material and a welding torch for welding the base material, varying a camera control parameter of the camera device and receiving a plurality of camera control parameter-varied images from the camera device, identifying the predetermined object from the plurality of received images and generating an object tracking image, and outputting the captured images, the received images, or the generated object tracking image.

The base material may include a marker that may be identified by a controller.

The predetermined object may include the welding torch, a welding tip, and a marker included in the base material.

The object tracking image may include coordinates of each of predetermined objects, or the object tracking image includes the coordinates of each of the predetermined objects and a trajectory of the coordinates varied while welding is performed.

According to various embodiments, control parameters including the camera gain value or exposure value may be automatically adjusted with respect to a target object designated by the user, and the results of the adjustment may be provided as an object tracking image, thereby allowing for a real-time identification and tracking of the target object in a welding image captured in a welding environment with a high dynamic range resultant from welding light or the work environment.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Various changes may be made to the present invention, and the present invention may come with a diversity of embodiments. Some embodiments of the present invention are shown and described in connection with the drawings. However, it should be appreciated that the present disclosure is not limited to the embodiments, and all changes and/or equivalents or replacements thereto also belong to the scope of the present disclosure. Similar reference denotations are used to refer to similar elements throughout the drawings.

The terms "first" and "second" may be used to describe various components, but the components should not be limited by the terms. The terms are used to distinguish one component from another. For example, a first component may be denoted a second component, and vice versa without departing from the scope of the present disclosure. The term "and/or" may denote a combination(s) of a plurality of related items as listed or any of the items.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

The terms as used herein are provided merely to describe some embodiments thereof, but not to limit the present disclosure. As used herein, the singular forms "a," "an," and "the" are intended to include the plural forms as well, unless the context clearly indicates otherwise. As used herein, the term "comprise," "include," or "have" should be appreciated not to preclude the presence or addability of features, numbers, steps, operations, components, parts, or combinations thereof as set forth herein.

Unless otherwise defined, all terms including technical and scientific terms used herein have the same meaning as commonly understood by one of ordinary skill in the art to which the embodiments of the present disclosure belong.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The components, processes, steps, or methods according to embodiments of the disclosure may be shared as long as they do not technically conflict with each other.

Figure 1:
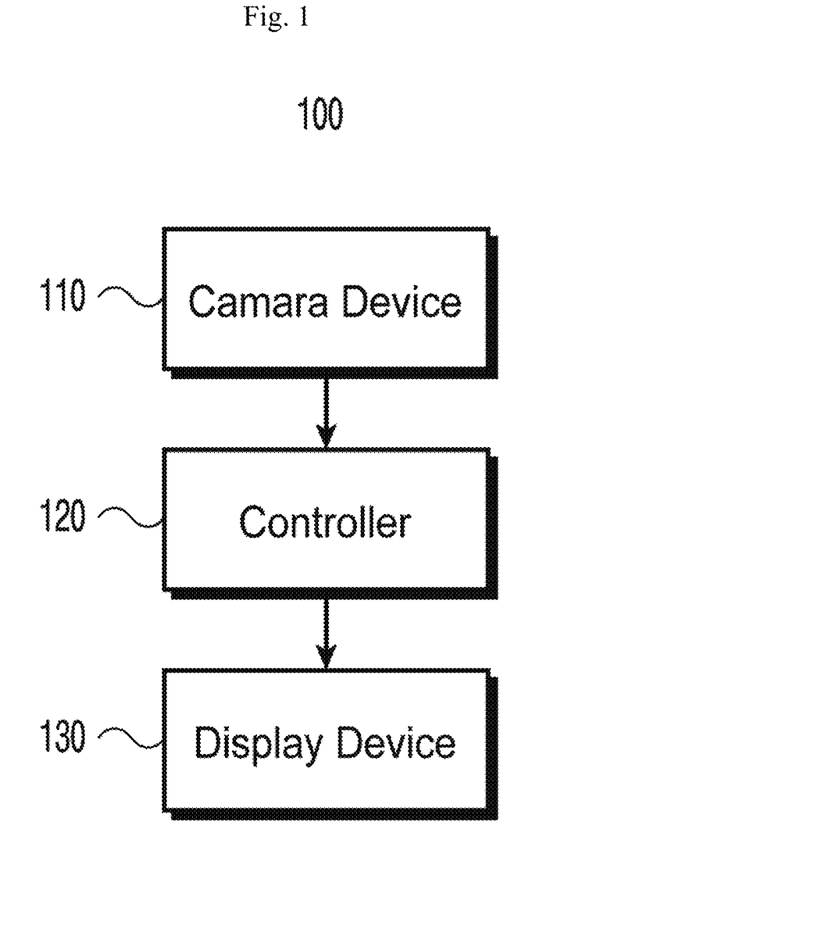
FIG. 1 is a block diagram illustrating a configuration of an object tracking device in a welding process according to an embodiment.

FIG. 1 is a block diagram illustrating a configuration of an object tracking device in a welding process according to an embodiment.

Referring to FIG. 1, according to an embodiment, an object tracking device 100 in a welding process may include a camera device 110, a controller 120, and a display device 130. According to an embodiment, the camera device 110, the controller 120, and the display device 130 may be independently implemented or may be integrated together.

The object tracking device 100 captures or obtains a welding image, identifies a predetermined object in the welding image, extracts information (e.g., information about the predetermined object, extracted from the welding image), and provides the extracted information to a wearer (or worker or technician) wearing the object tracking device 100. The object tracking device 100 may be implemented as a welding mask or welding protective gear that is worn on the wearer (also referred to as a worker, technician, user, or operator), protecting the wearer from the welding environment and allowing the wearer to more easily or smoothly perform welding.

The camera device 110 may include at least one camera. The camera device 110 captures or objects the welding image using one or more cameras and transmits the welding image to the controller 120. The camera device 110 may be positioned in the object tracking device 100 to capture or obtain the welding image. For example, the camera device 110 may be positioned on a portion of a welding mask or welding goggles, as the object tracking device 100. The camera device 110 captures or obtains the welding image and transmits the welding image to the controller 120. The welding image captured by the camera device 110 is shown in FIG. 2.

The controller 120 may also be referred to as a tracking controller.

Figure 2:
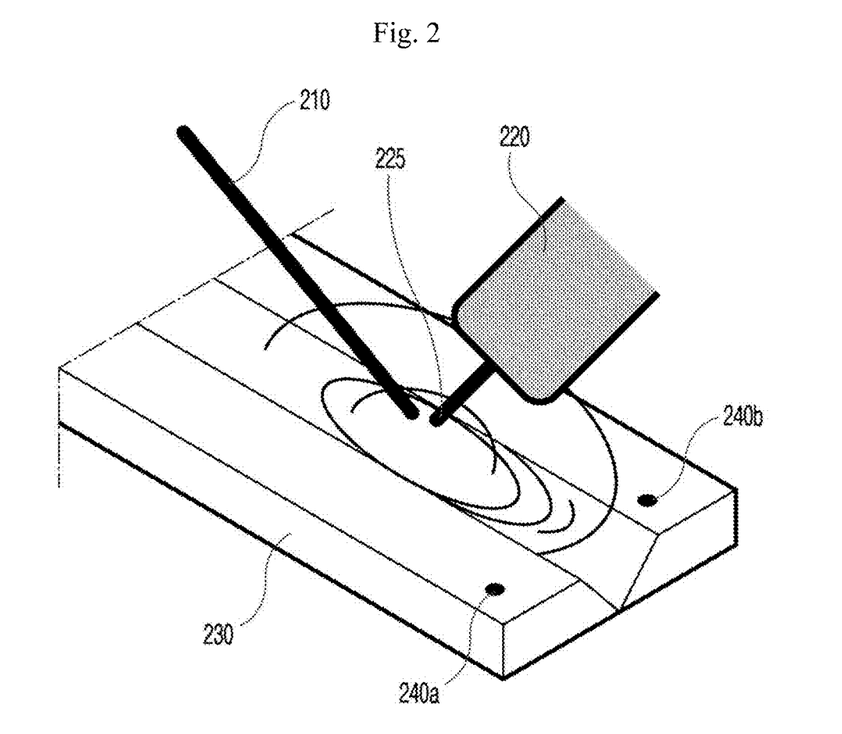
FIG. 2 is a view illustrating a welding image captured by a camera device according to an embodiment.

FIG. 2 is a view illustrating a welding image captured by a camera device according to an embodiment.

Referring to FIG. 2, in a welding site, the welding torch 220 generates heat or electric arc at a welding tip 225, joining a welding member 210 and a base material 230. The worker may be required to grasp the positions (e.g., the interval between the base material 230 and the welding tip 225) of, at least, the welding torch 220, the welding tip 225, and the base material 230 in the welding image. The camera device 110 captures a welding image including at least marker 240a and 240b in the base material 230 to allow the position of the welding torch 220, the welding tip 225, and the base material 230 to be grasped. The controller 120 may extract information, which may be required by the worker during welding, by identifying the welding torch 220, the welding tip 225, and the marker 240a and 240b in the welding image. The marker 240a or 240b may have a color having an opposite reflection spectrum from the reflection spectrum of the welding light.

Referring back to FIG. 1, the controller 120 may vary at least one camera control parameter of the camera device 110, receive a plurality of welding images from the camera device 110, identify a predetermined object from the received welding images, and generate an object tracking image.

If the welding site is captured by a typical camera, and automatic exposure is applied, the exposure value is adjusted based on the average value of all the image brightness values. The welded portion may be much brighter than the surroundings due to the heat or electric arc generated from the welding tip 225. In other words, since the image captured for the welding environment has a very wide dynamic range, the visibility of the predetermined object may be significantly deteriorated in the welding image captured with a single camera control parameter. In particular, in the case where the camera is set to automatic exposure in the welding process, since the welding light is very bright, the camera exposure value may be controlled by the brightness of the welding light, so that the other objects than the welding light may be visible significantly poorly in the welding image.

According to an embodiment, the controller 120 may vary at least one camera control parameter of the camera device 110 and receive a plurality of welding images from the camera device 110. The controller 120 varies the at least one camera control parameter of the camera device 110. The at least one camera control parameter may include the camera exposure value, color gain value, gamma value, or black level. Since the welded portion in the welding image is significantly bright, the controller 120 may control the color gain value among the camera control parameters as follows. The color gain value of the welding image is shown in FIG. 4.

Figure 4:
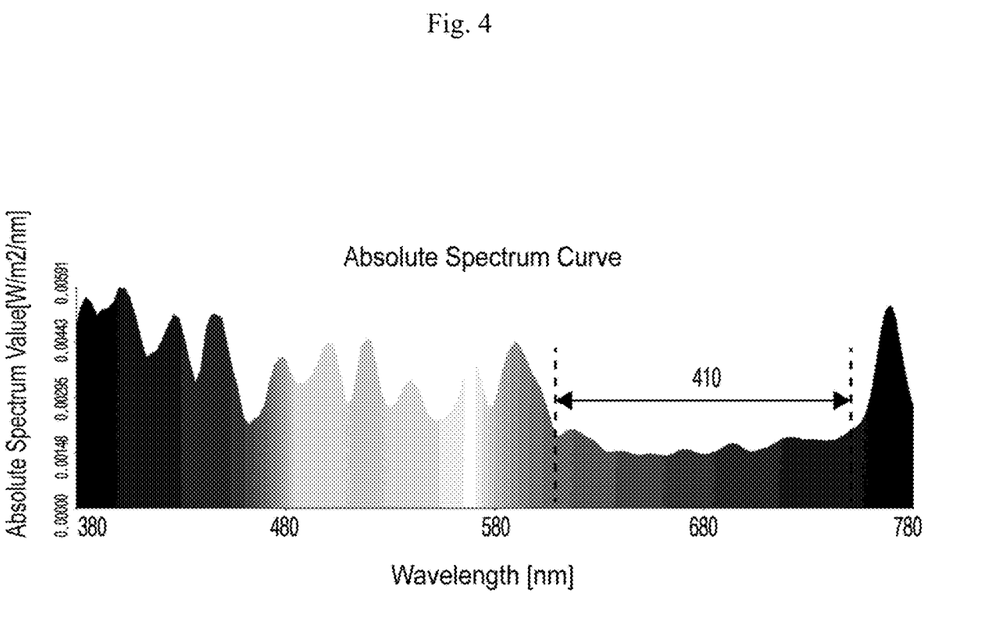
FIG. 4 is a view illustrating a spectrum of welding light.

FIG. 4 is a view illustrating a spectrum of welding light.

The welding light typically has a spectrum as shown in FIG. 4 although there may be a slight difference depending on the welding scheme or the type of the welding member 210. In a wavelength band 410 ranging from 610 nm to 750 nm, a relatively significantly low spectrum strength occurs whereas the other wavelength bands exhibit a relatively high spectrum strength. By such nature, if the color gain value for the wavelength band 410 of the camera device 110 becomes higher than other color gain values, the welded portion in the welding image may present such an effect as if it has been filtered to be relatively dark.

Although FIG. 4 illustrates an example in which the wavelength band 410 ranging from 610 nm to 750 nm has a relatively low spectrum strength, the wavelength band with a relatively low spectrum strength may be varied depending on welding environments or base materials.

Referring back to FIG. 1, the controller 120 may enable, or control, the camera device 110 to vary its camera control parameter and capture a plurality of welding images.

The controller 120 may identify a predetermined object from the plurality of received welding images and extract information (e.g., information about the predetermined object, extracted from the welding image). The predetermined object may be a target necessary for the worker to perform welding. For example, there may be a plurality of predetermined objects which may include the welding torch 220, the welding tip 225, and the markers 240a and 240b (corresponding to the base material 230). The controller 120 may identify the predetermined object and extract the information using an image appropriate for identifying the predetermined object among the plurality of welding images with different camera control parameters. The information extracted by the controller 120 may include the coordinates (or position) of the object.

The controller 120 generates an object tracking image including the extracted information. Since the controller 120 continuously extracts the information, e.g., the coordinates of the object, from the welding image, the controller 120 may generate a path or route along which the welding has been done by the worker. The controller 120 may receive a path or route, along which the welding is to be performed, from the worker before the welding is performed. The controller 120 may generate an object tracking image based on the path or route, along which the welding is to be performed, the current coordinates of the object, and the path or route, along which the welding has been done.

The display device 130 outputs the object tracking image generated by the controller 120. The display device 130 outputs the object tracking image in a portion of the field of view of the worker, so that the worker may recognize information necessary for welding. The display device 130 may output the information (e.g., the extracted information), along with the images captured by the camera device 110 or the plurality of welding images received by the controller 120. Thus, the worker may more clearly or easily recognize the welded portion.

Figure 3:
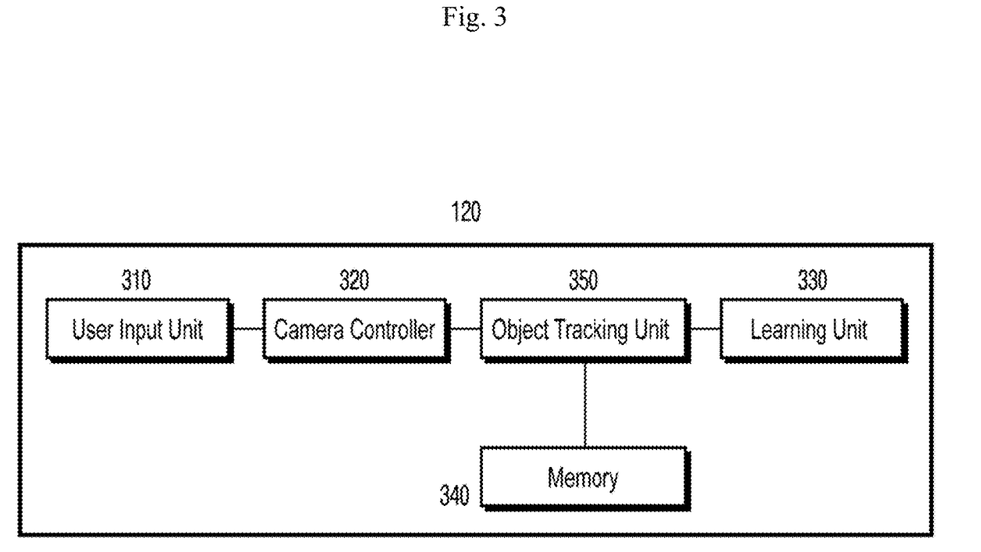
FIG. 3 is a view illustrating a configuration of a controller according to an embodiment.

FIG. 3 is a view illustrating a configuration of a controller according to an embodiment.

Referring to FIG. 3, according to an embodiment, the controller 120 may include a user input unit 120, a camera controller 320, a learning unit 330, a memory 340, and an object tracking unit 350. Each of the components, e.g., the user input unit 310, the camera controller 320, the learning unit 330, and the object tracking unit 350 may include, or be implemented as, an electrical circuit or circuitry configured to perform its corresponding functions or operations.

The user input unit 310 may include various input devices, such as a keyboard, a mouse, or a touchscreen, but not limited thereto.

The learning unit 330 may be implemented as a processor or a circuit to perform the functions or operations of the learning unit 330 as described below.

The object tracking unit 350 may be implemented as a processor or a circuit to perform the functions or operations of the object tracking unit 350 as described below.

The memory 340 may include various types of memory devices, including, but not limited to transitory or non-transitory, volatile, or non-volatile memories, such as random access memory (RAM), read-only memory (ROM), compact-disc (CD) ROM, flash memories, hard disks, or other various memory or storage devices.

The user input unit 310 receives information about the welding environment from the worker. The user input unit 310 may receive the welding environment information from the user before the welding is performed. The welding environment information may include information by which the quality of the image (e.g., welding image) may be varied, such as welding type or scheme or the type of welding member 210. If the type of welding or the type of welding member 210 is varied, the spectrum of the light generated at the welded portion may be varied. Thus, the camera control parameter for properly recognizing the predetermined object in the welding image may be required to be varied. The user input unit 310 receives the welding environment information from the worker so that the camera controller 320 may control the camera device 110 using the camera control parameter appropriate for the worker's welding environment.

The user input unit 310 may also receive a route, along which the welding is to be performed, from the worker. In the case where the object tracking unit 350 generates an object tracking image, outputting a route along which the welding is to be performed may aid in enhancing the worker's working efficiency. Thus, the user input unit 310 may receive the route, along which the welding is to be performed, from the worker.

The camera controller 320 may select camera control parameters appropriate for the welding environment or the received welding environment information and control the camera device 110 to capture a plurality of welding images using the selected camera control parameters. The camera controller 320 may control the camera device 110 to set or configure camera control parameters appropriate for identifying predetermined objects and capture images. The captured images, of which the camera control parameters have been varied under the control of the camera controller 320, are shown in FIGS. 5A to 5D.

FIGS. 5A, 5B, 5C, and 5D are views illustrating an image captured by a camera device, with camera control parameters varied under the control of a controller, according to an embodiment.

Figure 5A:
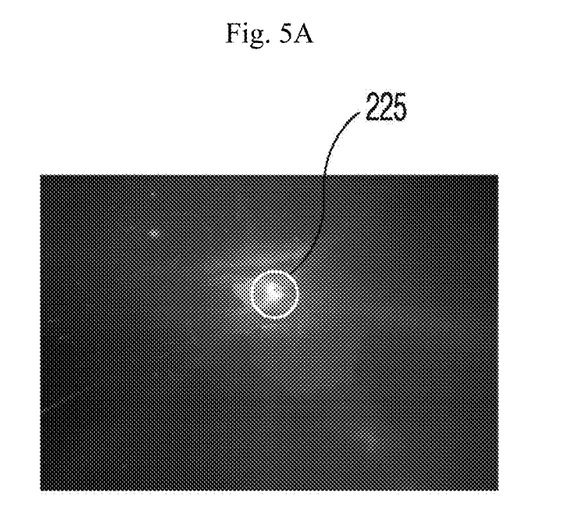
FIGS. 5A, 5B, 5C, and 5D are views illustrating an image captured by a camera device, with camera control parameters varied under the control of a controller, according to an embodiment.

FIG. 5A illustrates an image obtained when, among the camera control parameters of the camera device 110, the exposure value is set to be relatively smallest by the camera controller 320, and the color gain value for the wavelength band 410 is set not to be high by the camera controller 320. Referring to FIG. 5A, since the exposure value is smallest, the welding torch 220 or marker 240a or 240b in the base material is not recognized, while only the welding tip 225, which is the brightest portion, is recognized. Thus, the coordinates (e.g., position) of the welding tip 225 may be precisely or accurately identified from the image.

Figure 5B:
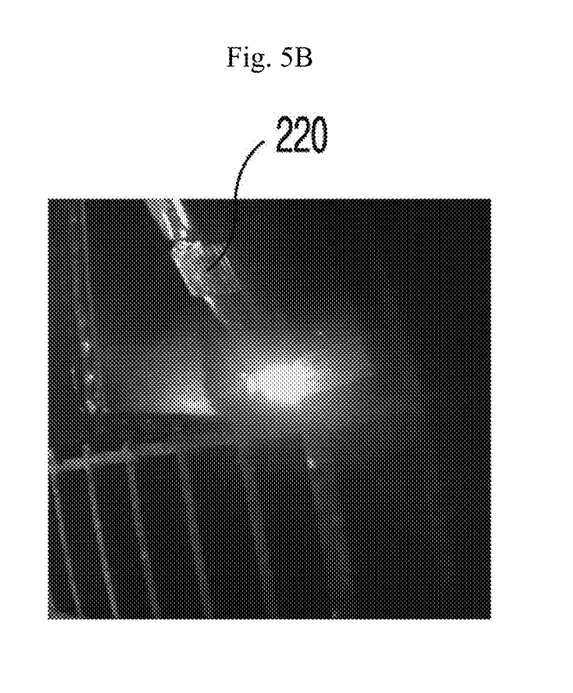

FIG. 5B illustrates an image obtained when the exposure value is set to be relatively higher than the exposure value in FIG. 5A, and the color gain value for the wavelength band 410 is set to be relatively high (e.g., higher than that in FIG. 5A). Thus, the welding torch 220, along with the welding tip 225, may be clearly recognized. Thus, the coordinates (e.g., position) of the welding torch 220 may be precisely or accurately identified from the image.

Figure 5C:
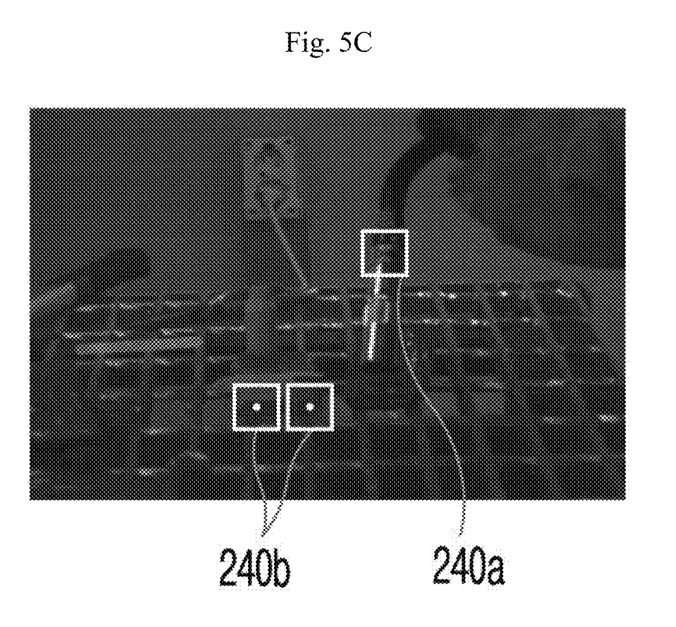
Figure 5D:
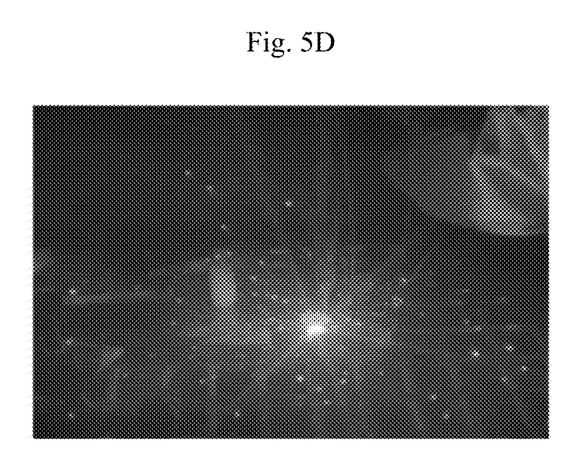

FIGS. 5C and 5D illustrates images obtained when the exposure value and the color gain value for the wavelength band 410 are set to be higher than those in FIG. 5A or 5B. In the image, the markers 240a and 240b included in the base material may be further recognized clearly.

Referring back to FIG. 3, the camera controller 320 selects the camera control parameters, where each predetermined object as shown in FIGS. 5A to 5D may be clearly recognized, from the memory 340 based on, or with reference to, the received welding environment. The camera controller 320 may control the camera device 110 to vary the camera control parameters to the selected camera control parameters and capture welding images and may receive a plurality of images (e.g., welding images) from the camera device 110.

The learning unit 330 may generate and store learning data based on feature information for the predetermined objects in the plurality of welding images. A learning process by the learning unit 330 is shown in FIGS. 7 and 8.

Figure 7:
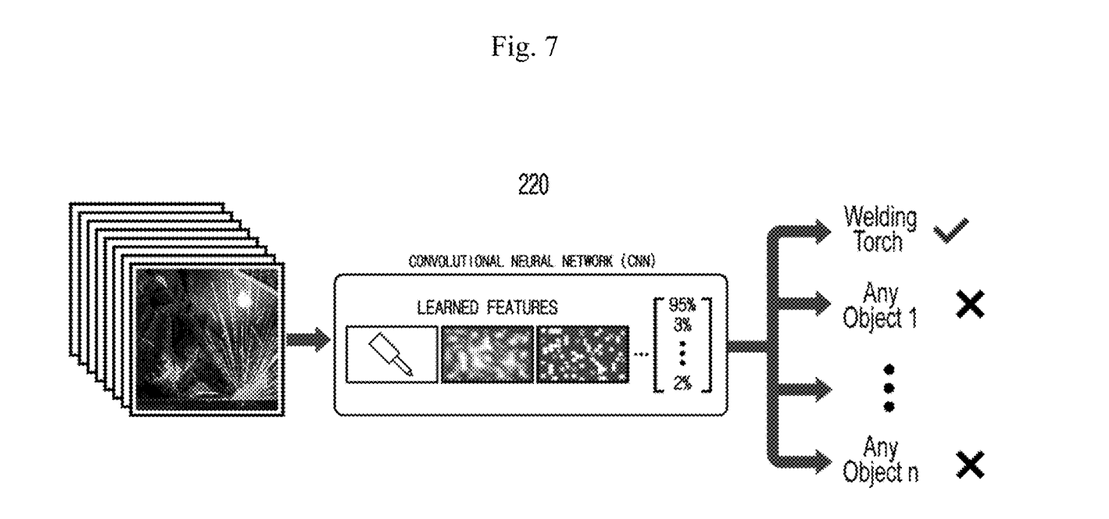
FIGS. 7 and 8 are views illustrating a learning process performed by a learning unit according to an embodiment.
Figure 8:
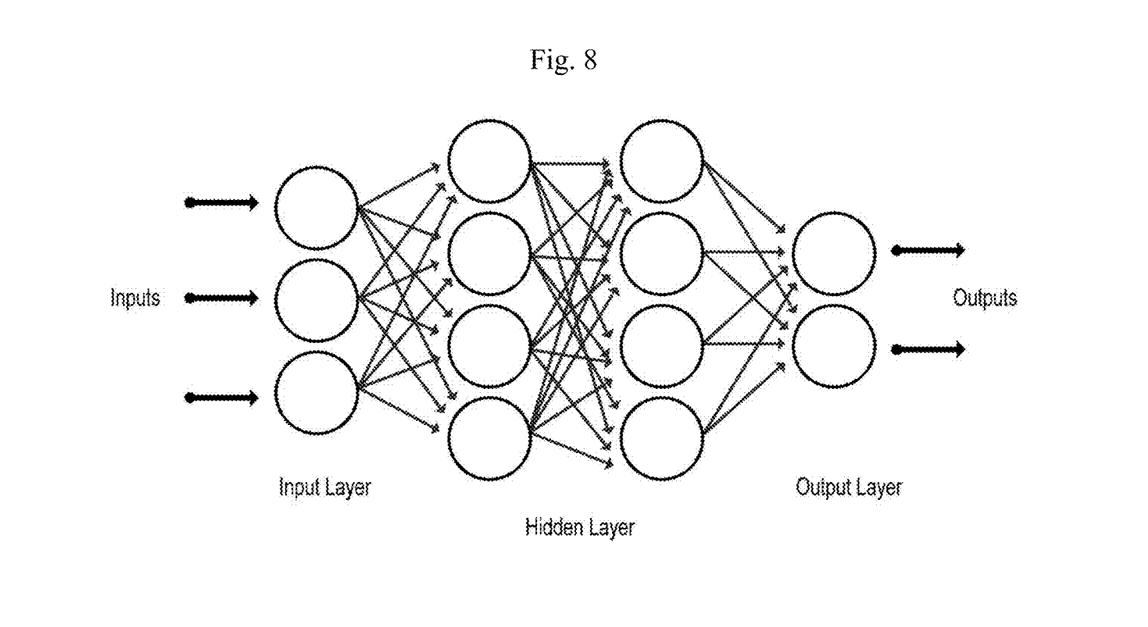

FIGS. 7 and 8 are views illustrating a learning process performed by a learning unit according to an embodiment.

The learning unit 330 may use various object detection algorithms, including a convolutional neural network (CNN) algorithm, a you-only-look-once (YOLO) algorithm, or a faster region-based convolutional neural network (RCNN) algorithm. Among the object detection algorithms, the CNN includes an input layer, an output layer, and several hidden layers between the input layer and the output layer, and each layer performs calculations that change data to learn features that only the corresponding data has, and the layers that may be used may include a convolutional, activation/rectified linear unit (ReLU), and pooling layer.

The convolutional layer passes the input image through the convolution filter set activating a specific feature in each image. The ReLU layer maps negative values to 0 and maintains positive values to enable faster and more effective learning. This process is also called activation because only activated features are transferred to the next layer. The pooling layer simplifies the output by performing nonlinear downsampling and reducing the number of parameters to be learned by the network.

The learning unit 330 learns feature information about the predetermined objects from a number of images (e.g., welding images) for the predetermined objects stored in the memory 340 and provides a classification output using a classification layer. The learning unit 330 collects welding images captured in various welding environments and uses the collected welding images as learning data. The learning unit 330 may learn welding images including a diversity of variables, such as the worker's gaze, the distance between the worker and the welding torch, the distance between the welding torch and the welding line, and the distance between the worker and the object to be welded, lighting environment, work environment, reflection characteristics of the object to be welded, or various brightness values of welding light.

The learning unit 330 may store learning data which includes pairs of input data (welding images) and output data (features of the predetermined objects) and, when new input data is entered, the learning unit 330 may predict output data using the stored learning data.

The memory 340 stores the camera control parameters appropriate for each welding environment and the plurality of welding images that enable the learning unit 330 to generate the learning data.

The memory 340 stores camera control parameters appropriate for various welding environments. When the user input unit 310 receives the welding environment from the worker, the camera controller 320 may select camera control parameters appropriate for the received welding environment.

The memory 340 may store various welding images and provide the welding images to the learning unit 330 so that the learning unit 330 may learn the features of the predetermined objects from the welding images and generate learning data. The memory 340 may further store the plurality of images provided from the camera device 110, so that the learning unit 330 may also learn the images provided from the camera device 110.

The object tracking unit 350 may identify objects from the plurality of images received by the camera controller 320, thereby generating an object tracking image.

The object tracking unit 350 may perform pre-treatment on the plurality of images received by the camera controller 320 and then identify the predetermined objects using the learning data of the learning unit 330. As described above in connection with FIG. 5, the object tracking unit 350 identifies each of the predetermined objects learned by the learning unit 330 from the images with different camera control parameters. The object tracking unit 350 may perform pre-treatment on the images before identifying the predetermined objects so as to enhance the identification. As the camera control parameter is varied, the black image is varied. As used herein, black image may refer to an image for identifying sensor noise. For example, an image captured by the camera, with the camera covered with a cap, may be a black image. Examples of the black image are shown in FIGS. 6A and 6B.

Figure 6A:
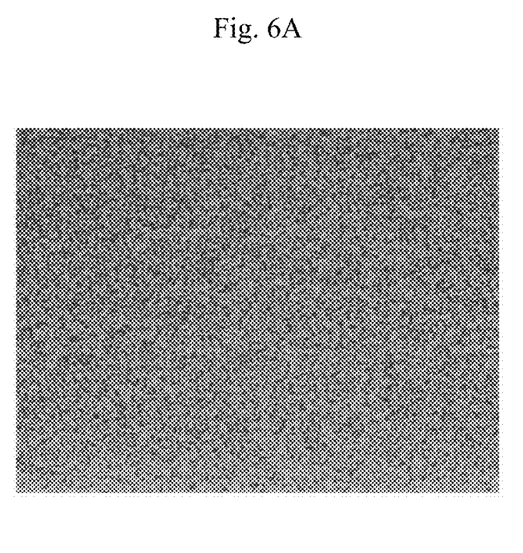
FIGS. 6A and 6B are views illustrating black images with different camera control parameters, obtained by a camera device.
Figure 6B:
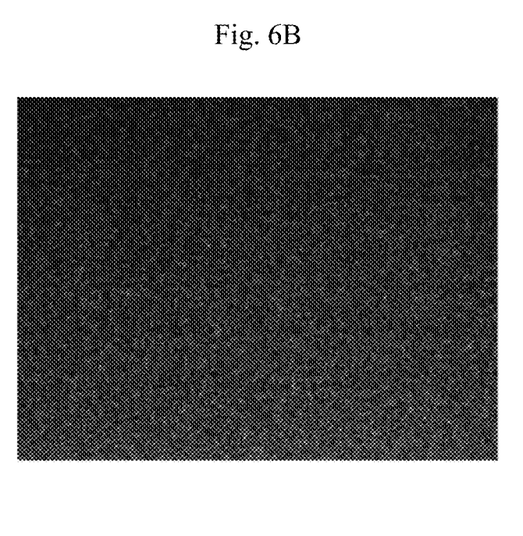

FIGS. 6A and 6B are views illustrating black images with different camera control parameters, obtained by a camera device.

FIGS. 6A and 6B illustrate black images captured by the camera device 110, with the camera device 110 set with different camera control parameters. When a camera is covered with a cap, the images captured by the camera are theoretically supposed to be dark images with the same brightness. However, the sensor noise may be varied depending on the camera control parameters, and different black images may be obtained as shown in FIGS. 6A and 6B. The different black images may negatively affect the identification of the predetermined objects in the image (e.g., welding image).

To address such issue, the object tracking unit 350 may perform pre-treatment to remove, subtract, or reduce the black images, which individually correspond to the camera control parameters, of the plurality of (welding) images before identifying the predetermined objects.

After performing the pre-treatment, the object tracking unit 350 may identify the predetermined objects in each image and extract the coordinates of the objects. The object tracking unit 350 may identify the predetermined objects in the images with different camera control parameters and extract the coordinates of the predetermined objects using the learning data generated by the learning unit 330. The object tracking unit 350 may recognize the start or termination of welding based on whether the welding torch 220 is identified from the image where the welding torch 220 is most easily recognized. Upon recognizing the start of welding, the object tracking unit 350 may identify the predetermined objects in each image and extract the coordinates of the objects. In identifying the predetermined objects, the object tracking unit 350 may synthesize, combine, or merge, the (welding) images into, e.g., a high dynamic range (HDR) image and may identify the predetermined objects from the synthesized image. Preferably, the object tracking unit 350 identifies the predetermined objects in each image without synthesizing the images. The synthesis of the images may be time-consuming and may thus deteriorate real-time processing. Further, such image synthesis may require an additional, high-cost component (e.g., a computation device). Further, when the images are synthesized or tone-mapped, the quality of the synthesized image may be significantly degraded depending on the camera control parameters of the images, so that the rate of recognition of the predetermined objects may be reduced. Thus, preferably, the object tracking unit 350 identifies the predetermined objects in each image without synthesizing the images.

The object tracking unit 350 may generate an object tracking image including only the coordinates of the predetermined objects extracted, or the object tracking unit 350 may generate an object tracking image including trajectories (e.g., the path or route along which the welding is done) of the coordinates of the predetermined objects, which are varied while the welding is performed, as well as the coordinates of the predetermined objects. The object tracking unit 350 may further include a path or route, along which the welding is to be performed, (which is received by the user input unit 310), in the object tracking unit 350 including the coordinates of the predetermined objects and the trajectories. For example, the object tracking unit 350 may generate an object tracking image including all of the path along which the welding is to be performed, the coordinates of the predetermined objects, and the trajectories of the coordinates. Thus, the worker may identify all of the path along which the work has performed the welding, the current situation of welding, and the path along which the welding is to be performed, from the object tracking image.

As described above in connection with FIGS. 1 to 8, the object tracking device 100 in a welding process includes one camera device 110, and the controller 120 varies the camera control parameters of the camera device 110 and obtains a plurality of images. However, embodiments of the disclosure are not limited thereto. For example, the object tracking device 100 in a welding process may include a plurality of camera devices, and the controller 120 may set or configure different camera control parameters in the camera devices and obtain a plurality of images. When the object tracking device 100 includes a plurality of camera devices, the controller 120 may set camera control parameters in each camera device, or the controller 120 may receive camera control parameters, which are arbitrarily set or configured by the worker, from the worker and set or configure the camera control parameters.

Figure 9:
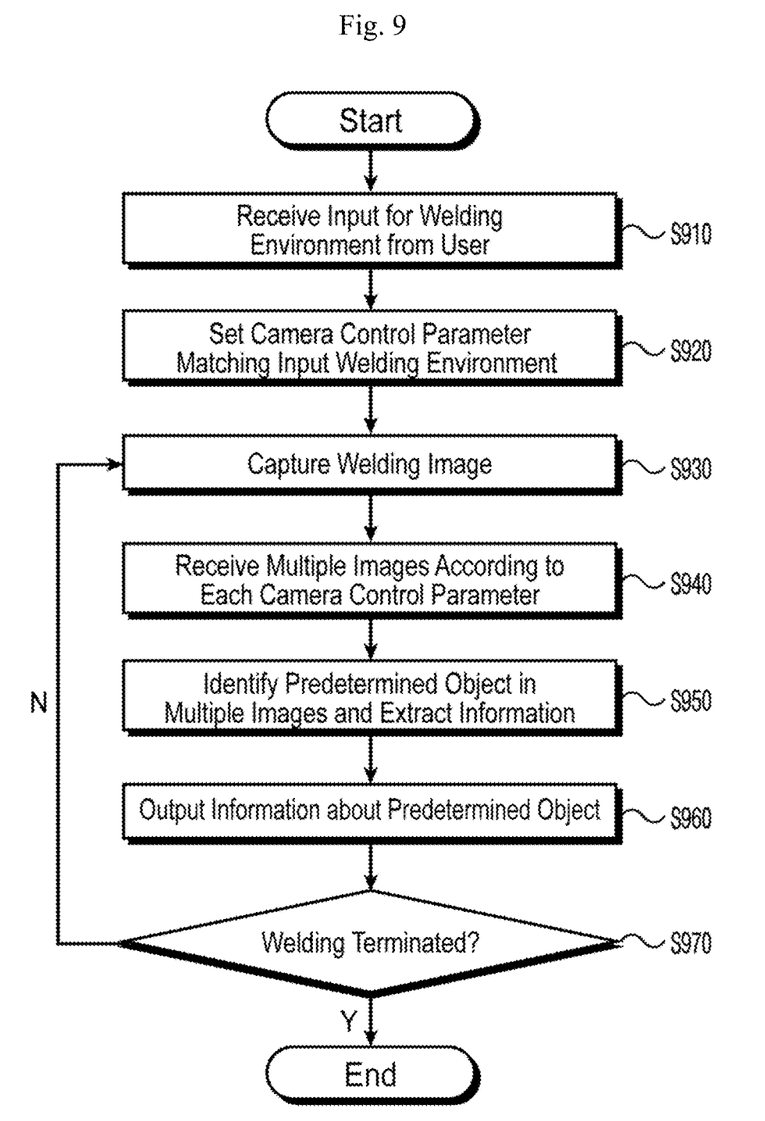
FIG. 9 is a flowchart illustrating a method for tracking a predetermined object by an object tracking device in a welding process according to an embodiment.

FIG. 9 is a flowchart illustrating a method for tracking a predetermined object by an object tracking device in a welding process according to an embodiment.

The controller 120 receives an input for a welding environment from the user (or worker) (S910). The controller 120 may further receive an input for a path along which the welding is to be performed, from the user.

The controller 120 sets or configures camera control parameters appropriate for, suitable for, or matching, the received welding environment (S920).

The camera device 110 captures at least one welding image (S930).

The controller 120 may receive multiple welding images according to the camera control parameters (S940).

The controller 120 may identify at least one predetermined object from the multiple welding images and extract information (e.g., information about the predetermined object, extracted from the welding image) (S950). The controller 120 may generate learning data based on feature information about the predetermined objects in the plurality of various welding images to identify the predetermined objects. The controller 120 may identify the predetermined objects in each image using the generated learning data. The controller 120 may recognize the start of welding. Upon recognizing the start of welding, the controller 120 may identify the predetermined objects in each image and extract the coordinates of the objects. The controller 120 may extract information about the identified objects and generate an object tracking image.

The display device 130 may output the information about the predetermined objects (S960). The display device 130 may output the object tracking image (S960).

The controller 120 determines whether the welding is terminated (S970). The controller 120 may determine whether the welding is terminated based on whether the welding tip 225 is identified from the image from which the welding tip 225 may easily be identified. When the welding is terminated, the controller 120 terminates the operation. Unless the welding is terminated, the camera device 110 continuously or steadily captures images according to the camera control parameters, and the above-described operations S930 and S970 may be repeated.

Although FIG. 9 illustrates that the steps are sequentially performed, this merely provides an embodiment of the disclosure. It would readily be appreciated by a skilled artisan that the steps of FIG. 5 are not limited to the order shown but may rather be performed in a different order, one or more of the steps may simultaneously be performed, or other various modifications or changes may be made thereto without departing from the scope of the disclosure The steps or processes described above in connection with FIG. 5 may be implemented as computer-readable code in a recording medium. The computer-readable recording medium includes all types of recording devices storing data readable by a computer system. The computer-readable recording medium includes a storage medium, such as a magnetic storage medium (e.g., a ROM, a floppy disk, or a hard disk) or an optical reading medium (e.g., a CD-ROM or a DVD). Further, the computer-readable recording medium may be distributed to computer systems connected via a network, and computer-readable codes may be stored and executed in a distributed manner.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

This invention was made with Korean government support under a research project (Project No.: 1415167519; Project Title: Development of AR device and supporting system for welding process) awarded in 2020 by the Korea Evaluation Institute of Industrial Technology ("KEIT").

What is claimed is:

1. An object tracking device in a welding process, the object tracking device tracking and outputting predetermined, at least one object in a welding image, the object tracking device comprising:

a camera device capturing the welding image including a base material and a welding torch for welding the base material;

a controller setting or changing at least one camera control parameter according to a welding environment input by a user, controlling the camera device to capture a plurality of images based on the at least one camera control parameter, receiving the captured images from the camera device, identifying the at least one object in the received images, and generating an object tracking image including coordinates or a trajectory of the at least one object; and an output device outputting the welding image, the plurality of images, or the object tracking image, wherein the controller identifies coordinates of a first object of the at least one object according to first settings of the at least one camera control parameter, identifies coordinates of a second object of the at least one object according to second settings of the at least one camera control parameter, and identifies coordinates of a third object of the at least one object according to third settings of the at least one camera control parameter.

2. The object tracking device of claim 1, wherein the base material includes a marker that may be identified by the controller.

3. The object tracking device of claim 2, wherein the at least one object includes the welding torch, a welding tip, and the marker.

4. The object tracking device of claim 1, wherein the at least one camera control parameter includes at least one of a camera exposure value, a camera sensor color gain value, a gamma value, and a black level.

5. The object tracking device of claim 2, wherein the marker has an opposite reflection spectrum from a spectrum of welding light.

6. The object tracking device of claim 1, wherein the controller performs pre-treatment to remove, subtract, or reduce a black image captured by the camera device according to each camera control parameter from the received images to remove noise.

7. A tracking controller tracking predetermined, at least one object in a welding image obtained using a camera, the tracking controller comprising:

a user input unit receiving an input for a welding environment from a user;

a camera controller setting or changing at least one camera control parameter of the camera according to the welding environment received by the user, controlling the camera to a plurality of images based on the at least one camera control parameter, and receiving the captured images from the camera;

a learning unit designating the at least one object in a plurality of welding images and generating learning data based on feature information about the at least one object;

a memory storing the at least one camera control parameter according to the welding environment and the plurality of welding images by which the learning unit is able to generate the learning data; and an object tracking unit identifying the at least one object from the plurality of images received by the camera controller from the camera and generating an object tracking image including coordinates or a trajectory of the at least one object, wherein the controller identifies coordinates of a first object of the at least one object according to first settings of the at least one camera control parameter, identifies coordinates of a second object of the at least one object according to second settings of the at least one camera control parameter, and identifies coordinates of a third object of the at least one object according to third settings of the at least one camera control parameter.

8. The tracking controller of claim 7, wherein the camera controller varies the at least one camera control parameter of the camera into the at least one camera control parameter according to the welding environment and receives the plurality of camera control parameter-varied images from the camera.

9. The tracking controller of claim 7, wherein
the at least one object includes a welding torch, a welding tip, and a marker included in a base material.

10. The tracking controller of claim 7, wherein
the at least one camera control parameter includes at least one of a camera exposure value, a camera sensor color gain value, a gamma value, and a black level.

11. An object tracking method in a welding process to track and output predetermined, at least one object in a welding image, the object tracking method comprising:
  capturing the welding image using a camera device, the welding image including a base material and a welding torch for welding the base material;
  setting or changing at least one camera control parameter of the camera device according to a welding environment input by a user;
  controlling the camera device to capture a plurality of images based on the at least one camera control parameter;
  receiving the captured images from the camera device;
  identifying the at least one object from the plurality of received images and generating an object tracking image including coordinates or a trajectory of the at least one object; and
  outputting the captured images, the received images, or the generated object tracking image, wherein the controller identifies coordinates of a first object of the at least one object according to first settings of the at least one camera control parameter, identifies coordinates of a second object of the at least one object according to second settings of the at least one camera control parameter, and identifies coordinates of a third object of the at least one object according to third settings of the at least one camera control parameter.

12. The object tracking method of claim 11, wherein
the base material includes a marker that may be identified by a controller.

13. The object tracking method of claim 11, wherein
the at least one object includes the welding torch, a welding tip, and a marker included in the base material.

* * * * *